US012566420B2

(12) United States Patent
Tsai et al.

(10) Patent No.: US 12,566,420 B2
(45) Date of Patent: Mar. 3, 2026

(54) MODULE FOR PREDICTING SEMICONDUCTOR PHYSICAL DEFECTS AND METHOD THEREOF

(71) Applicant: UNITED MICROELECTRONICS CORP., Hsinchu (TW)

(72) Inventors: Pin-Yen Tsai, Hsinchu City (TW); Man-Ting Pang, Hsinchu City (TW); Yi-Jung Chang, Hsinchu City (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 645 days.

(21) Appl. No.: 18/113,818

(22) Filed: Feb. 24, 2023

(65) Prior Publication Data

US 2024/0241498 A1 Jul. 18, 2024

(30) Foreign Application Priority Data

Jan. 17, 2023 (TW) ................................. 112102103

(51) Int. Cl.
| | |
|---|---|
| *G06F 119/18* | (2020.01) |
| *G05B 19/406* | (2006.01) |
| *G06F 30/20* | (2020.01) |
| *G06F 30/27* | (2020.01) |

(52) U.S. Cl.
CPC ........... *G05B 19/406* (2013.01); *G06F 30/20* (2020.01); *G06F 30/27* (2020.01); *G05B 2219/32368* (2013.01)

(58) Field of Classification Search
CPC ........ G05B 19/406; G05B 2219/32368; G06F 30/20; G06F 30/27; G06F 2119/18; G06F 2119/00
See application file for complete search history.

(56) References Cited

U.S. PATENT DOCUMENTS

| | | | |
|---|---|---|---|
| 10,762,618 B1 | 9/2020 | Tsai | |
| 2018/0300434 A1* | 10/2018 | Hu | ...................... G03F 7/70508 |
| 2020/0265573 A1* | 8/2020 | Tsai | ........................ G06T 7/001 |

OTHER PUBLICATIONS

Tsai et al. U.S. Appl. No. 17/574,527 "Semiconductor system and operation method thereof" filed Jan. 12, 2022, USA.

* cited by examiner

*Primary Examiner* — Nghia M Doan
(74) *Attorney, Agent, or Firm* — WPAT, PC

(57) ABSTRACT
A module for predicting semiconductor physical defects includes a defect diagnosis unit used to detect at least one failure circuit in a semiconductor circuit structure; an information acquisition unit used for obtaining a semiconductor mask layout for forming the semiconductor circuit structure, and obtaining a failure path configuration diagram corresponding to the failure circuits and the location information corresponding to the failure path configuration diagram; a feature classification unit used for extracting a plurality of cutting images of the failure path configuration diagram, and performing feature classification on these cutting images to obtain a plurality of image groups; and a failure risk assessment unit used for performing a risk pre-assessment to select at least one high-risk group therefrom, and performing a failure risk analysis to predict at least one high failure risk position in the semiconductor mask layout according to the analysis results and the location information.

8 Claims, 8 Drawing Sheets

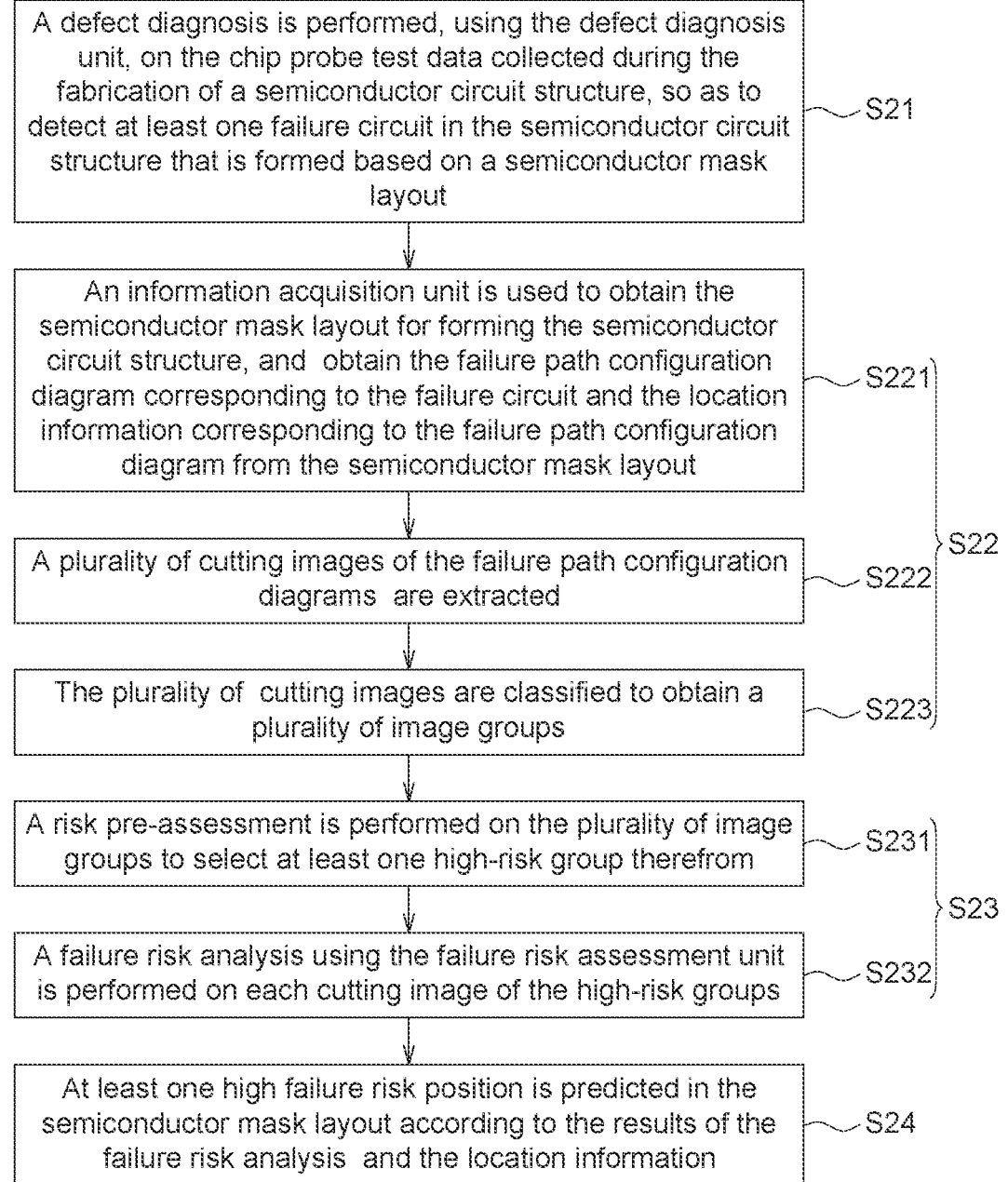

A defect diagnosis is performed, using the defect diagnosis unit, on the chip probe test data collected during the fabrication of a semiconductor circuit structure, so as to detect at least one failure circuit in the semiconductor circuit structure that is formed based on a semiconductor mask layout ⟵ S21

An information acquisition unit is used to obtain the semiconductor mask layout for forming the semiconductor circuit structure, and  obtain the failure path configuration diagram corresponding to the failure circuit and the location information corresponding to the failure path configuration diagram from the semiconductor mask layout ⟵ S221 ⎫
⎬ S22
A plurality of cutting images of the failure path configuration diagrams  are extracted ⟵ S222 ⎪

The plurality of  cutting images are classified to obtain a plurality of image groups ⟵ S223 ⎭

A risk pre-assessment is performed on the plurality of image groups to select at least one high-risk group therefrom ⟵ S231 ⎫
⎬ S23
A failure risk analysis using the failure risk assessment unit is performed on each cutting image of the high-risk groups ⟵ S232 ⎭

At least one high failure risk position is predicted in the semiconductor mask layout according to the results of the failure risk analysis  and the location information ⟵ S24

FIG. 2

MODULE FOR PREDICTING SEMICONDUCTOR PHYSICAL DEFECTS AND METHOD THEREOF

This application claims the benefit of Taiwan application Serial No. 112102103 filed at Jan. 17, 2023, the subject matter of which is incorporated herein by reference.

BACKGROUND

Technical Field

The disclosure relates to a detection module and the detection method applied the same in the design and/or manufacturing process of semiconductor circuits, and more particularly to a module for predicting semiconductor physical defects and method thereof in the design and/or manufacturing process of semiconductor circuits.

Description of Background

An automatic test pattern generation (ATPG) system is a system and method used for performing scan diagnosis (test) in a semiconductor wafer manufacturing process to detect physical defects in the formed semiconductor wafer. During the scan test, the circuit structure of the semiconductor chips to be scanned can be divided into multiple scan chain circuits (or scan chains), and a preset test pattern information (e.g. a vector information) corresponding to the individual scan chain circuit can be input from the pins to the semiconductor chip samples to perform a scan test. The timing data and scan results of the individual scan chain circuits are collected and compare them with a preset timing data and scan results to determine whether the individual scan chain circuits are abnormal or defective.

However, the length of each scan chain circuit and the number of circuit levels it crosses are generally quite large. Even if the scan test has determined that there is an abnormality or defect in a certain scan chain circuit, it is still not enough to resolve the location where the abnormality or defect occurs. Even if the scan test has determined that there is an abnormality or defect in a certain scan chain circuit, it still cannot determine the location where the abnormality or defect occurs. At present, the industry has applied physical failure analysis (PFA) technology to find the location of the physical defect on the defective scan chain circuit. However, PFA usually uses transmission electron microscope (transmission electron microscope, TEM) to verify the location of the physical defect, which requires repeated tests on a large number of semiconductor wafer samples, which is not only time-consuming and cost-intensive high. How to early figure out the systematic failure issue in the circuit structure of the semiconductor chip under the premise of taking into account the detection cost has become a common and urgent need in the industry.

Therefore, there is a need of providing a module for predicting semiconductor physical defects and method thereof to obviate the drawbacks encountered from the prior art.

SUMMARY

One aspect of the present disclosure is to provide a module for predicting semiconductor physical defects; the module includes a defect diagnosis unit, an information acquisition unit, a feature classification unit, and a failure risk assessment unit. The defect diagnosis unit is used to detect at least one failure circuit in a semiconductor circuit structure. The information acquisition unit is used for obtaining a semiconductor mask layout for forming the semiconductor circuit structure, and obtaining a failure path configuration diagram corresponding to the failure circuits and the location information corresponding to the failure path configuration diagram from the semiconductor mask layout. The feature classification unit is used for extracting a plurality of cutting images of the failure path configuration diagram, and performing feature classification on these cutting images to obtain a plurality of image groups. The failure risk assessment unit is used for performing a risk pre-assessment on these image groups to select at least one high-risk group therefrom, and performing a failure risk analysis on each cutting image in the high risk group to predict at least one high failure risk position in the semiconductor mask layout according to the results of the failure risk analysis and the location information.

Another aspect of the present disclosure is to provide a method for predicting semiconductor physical defects, wherein the method includes steps as follows: Firstly, a defect diagnosis is performed on a chip probe test data collected during the fabrication of a semiconductor circuit structure, so as to detect a failure circuit in the semiconductor circuit structure that is formed based on a semiconductor mask layout. Next, a feature classification is performed followed by a failure risk assessment. The feature classification includes sub-steps of obtaining a semiconductor mask layout for forming the semiconductor circuit structure; obtaining a failure path configuration diagram corresponding to the failure circuit and the location information corresponding to the failure path configuration diagram from the semiconductor mask layout; extracting a plurality of cutting images of the failure path configuration diagram, and classifying these cutting images to obtain a plurality of image groups. The failure risk assessment includes sub-steps of performing a risk pre-assessment on these image groups to select at least one high-risk group therefrom, and performing a failure risk analysis on each cutting image in the high risk group to predict at least one high failure risk position in the semiconductor mask layout according to the results of the failure risk analysis and the location information.

In accordance with the aforementioned embodiments of the present disclosure, a module for predicting semiconductor physical defects and method thereof are provided. Firstly, a defect diagnosis is performed on the chip probe test data collected during the fabrication of a semiconductor circuit structure based on a semiconductor mask layout, in which a ATPG system and a preset test pattern information corresponding to the semiconductor circuit structure are applied to detect at least one failure circuit from the semiconductor circuit structure. Next, a failure path configuration diagram corresponding to the at least one failure circuits and the location information (e.g. the vectors) corresponding to the failure path configuration diagram can be obtained from the semiconductor mask layout. A plurality of cutting images of the failure path configuration diagram are extracted, and a feature classification is performed on these cutting images to obtain a plurality of image groups. A risk pre-assessment is performed on these image groups to select at least one high-risk group therefrom, and a failure risk analysis is performed on each cutting image in the high risk group to predict at least one high failure risk position in the semiconductor mask layout according to the results of the risk assessment and the location information.

BRIEF DESCRIPTION OF THE DRAWINGS

The above objects and advantages of the present disclosure will become more readily apparent to those ordinarily skilled in the art after reviewing the following detailed description and accompanying drawings, in which:

FIG. 2 is a processing flowchart illustrating a method for predicting semiconductor physical defects, in accordance with one embodiment of the present disclosure.

DETAILED DESCRIPTION

Figure 1:
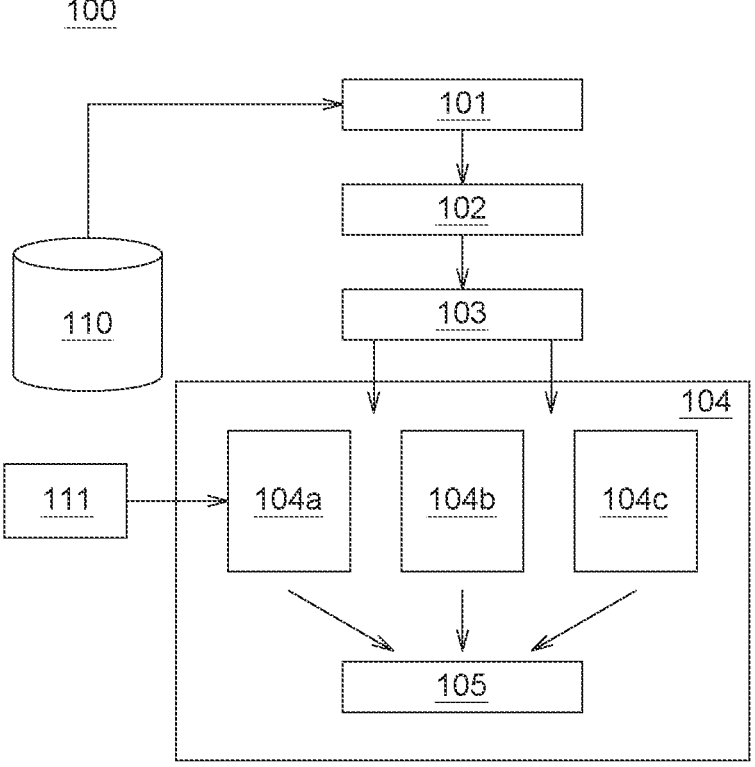
FIG. 1 is a system configuration diagram illustrating a module for predicting semiconductor physical defects, in accordance with one embodiment of the present disclosure.

The embodiments as illustrated below provide a module for predicting semiconductor physical defects and method thereof to early figure out the systematic failure issue in the circuit structure of the semiconductor chip without significantly increasing the detection costs. The present disclosure will now be described more specifically with reference to the following embodiments illustrating the structure and arrangements thereof.

It is to be noted that the following descriptions of preferred embodiments of this disclosure are presented herein for purpose of illustration and description only. It is not intended to be exhaustive or to be limited to the precise form disclosed. Also, it is important to point out that there may be other features, elements, steps, and parameters for implementing the embodiments of the present disclosure which are not specifically illustrated. Thus, the descriptions and the drawings are to be regard as an illustrative sense rather than a restrictive sense. Various modifications and similar arrangements may be provided by the persons skilled in the art within the spirit and scope of the present disclosure. In addition, the illustrations may not be necessarily drawn to scale, and the identical elements of the embodiments are designated with the same reference numerals.

FIG. 1 is a system configuration diagram illustrating a module 100 for predicting semiconductor physical defects, in accordance with one embodiment of the present disclosure. In some embodiments of the present disclosure, the module 100 for predicting semiconductor physical defects is used in the process for manufacturing a semiconductor circuit structure 30 (for example, a semiconductor wafer) to predict at least one high failure risk location prone to physical defects in a semiconductor mask layout.

The module 100 for predicting semiconductor physical defects includes a defect diagnosis unit 101, an information acquisition unit 102, a feature classification unit 103, and a failure risk assessment unit 104. Wherein, the defect diagnosis unit 101 is used for detecting at least faulty circuit in a semiconductor circuit structure. The information acquisition unit 102 is used for obtaining a semiconductor mask layout for forming the semiconductor circuit structure, and obtaining a failure path configuration diagram corresponding to the failure circuit and the location information corresponding to the failure path configuration diagram from the semiconductor mask layout. The feature classification unit 103 is used for extracting a plurality of cutting images of the failure path configuration diagram, and performing feature classification on these cutting images to obtain a plurality of image groups. The failure risk assessment unit 104 is used for performing a risk assessment on these image groups to predict at least one high failure risk position 105 in the semiconductor mask layout according to the results of the risk assessment and the location information.

FIG. 2 is a processing flowchart illustrating a method for predicting semiconductor physical defects, in accordance with one embodiment of the present disclosure. The method for predicting semiconductor physical defects includes steps as follows: Firstly, as described in step S21, a defect diagnosis is performed, using the defect diagnosis unit 101, on the chip probe test data collected during the fabrication of a semiconductor circuit structure 30, so as to detect at least one failure circuit 301 in the semiconductor circuit structure 30 that is formed based on a semiconductor mask layout.

Figure 3:
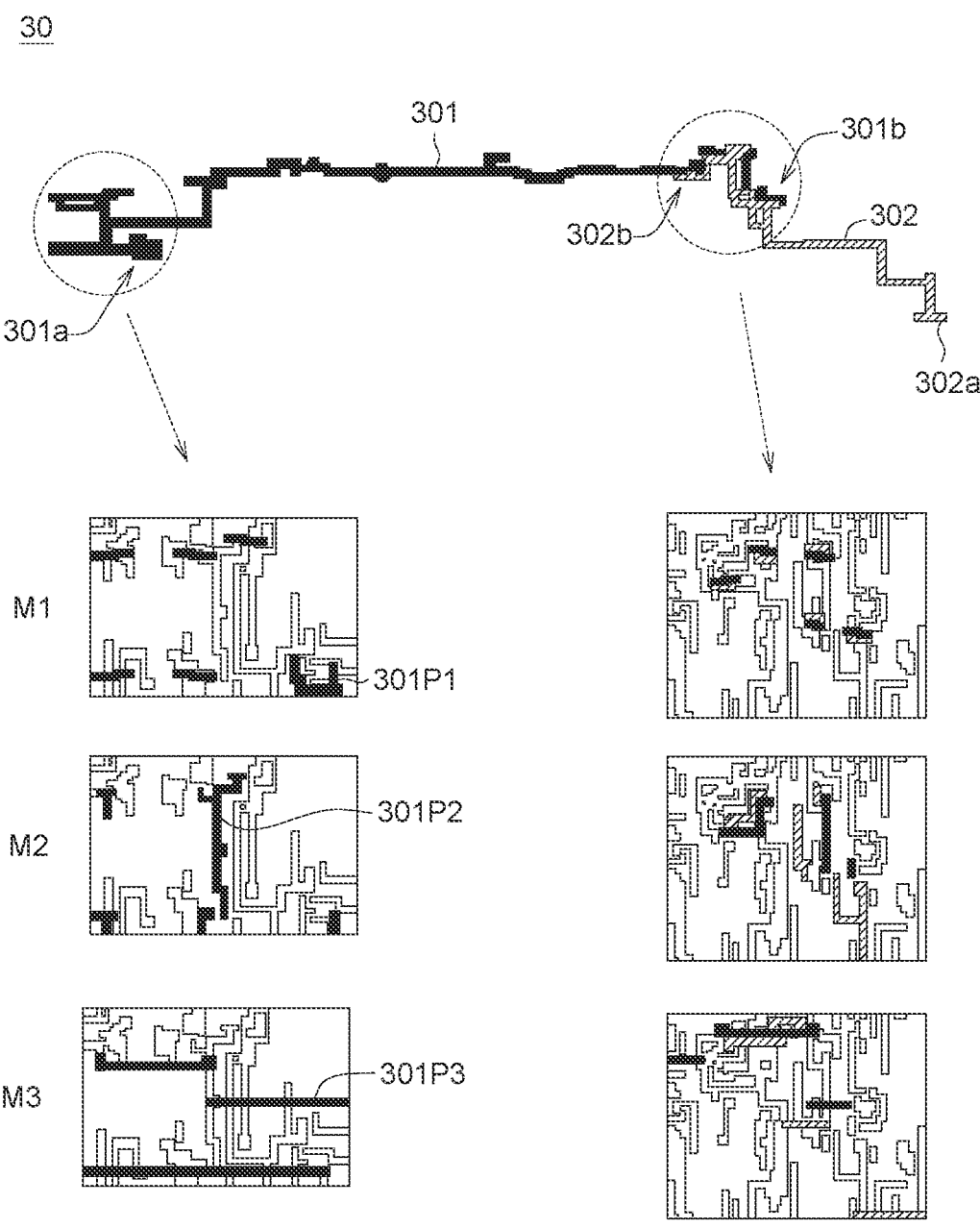
FIG. 3 is a diagram illustrating partial structure configuration of a semiconductor circuit fabricated based on a semiconductor mask layout, in accordance with one embodiment of the present disclosure.

FIG. 3 is a diagram illustrating partial structure configuration of the semiconductor circuit 30 fabricated based on the semiconductor mask layout in accordance with one embodiment of the present disclosure. In the present embodiment, the semiconductor circuit structure 30 (and its corresponding semiconductor mask layout) includes a multilayer three-dimensional structure of a plurality of circuit levels (e.g., circuit levels M1, M2 and M3). Each of the circuit levels M1, M2 and M3 includes different circuit patterns, and are electrically connected to each other through conductive via plugs (not shown) to form the semiconductor circuit structure 30. The semiconductor circuit structure 30 (and its corresponding semiconductor mask layout) can be divided into a plurality of different nets (e.g., nets 301 and 302) according to different functions or design purposes. Wherein, the nets 301 and 302 are respectively continuous sub-circuit structures, electrically isolated from each other, and can straddle cross different circuit levels M1, M2 and M3. Parts of the nets 301 and 302 are respectively disposed in different regions of the circuit layers M1, M2 and M3, and are electrically connected to each other through conductive via plugs (not shown).

In one embodiment of the present disclosure, the defect diagnosis unit 101 includes a scan-chain diagnosis unit. When performing the defect diagnosis, each individual net (for example, the net 301 or 302) is selected as a scan chain circuit. The test pattern information (for example, a vector information) preset by the semiconductor circuit structure 30 is input into the net 301 (or the net 302) through the pin 301a (or pin 302a) of the net 301 (or the net 302) to perform a scan test; and the timing data and the scanning results of the net 301 (or the net 302) can be collected through the pin 301b (or pin 302b) of the net 301 (or the net 302). The collected timing data and the scanning results are then compared with a preset timing data and a preset scanning results corresponding to the net 301 (or the net 302), and then it can be determined whether the net 301 (or net 302) is abnormal or defective (since the net 301 is determined as abnormal or defective, thus it is referred to as the failure circuit 301). In the present embodiment, the preset timing data and the preset scanning results corresponding to the net 301 in the defect diagnosis are provided by a chip probe test system 110 (as shown in FIG. 1) used to manufacture the semiconductor circuit structure 30.

Next, as described in step S22, a feature classification (feature grouping) is performed to the failure circuit 301 using the feature classification unit 103. In some embodiments of the present disclosure, the feature classification includes sub-steps as:

Firstly, as described in sub-step S221, the information acquisition unit 102 is used to obtain the semiconductor mask layout for forming the semiconductor circuit structure 30 (including the e.g., circuit levels M1, M2 and M3 as shown in FIG. 3), and used to obtain the failure path configuration diagrams corresponding to the failure circuit 301 and the location information corresponding to the failure path configuration diagrams from the semiconductor mask layout.

For example, the failure path configurations diagram corresponding to the failure circuit 301 is a collection of multiple (e.g. 3) two-dimensional (2D) circuit mask layout patterns corresponding to the circuit segments 301P1, 301 P2 and 301P3 respectively used to form the failure circuit 301 in different circuit levels M1, M2 and M3 (as shown in FIG. 3). The location information corresponding to the failure path configuration diagram includes the layer parameters (for example, 1, 2, and 3) respectively indicating which layer (one of the circuit layers M1, M2, and M) each circuit segment 301P1, 301P2 and 301P2 is located in, and the 2D coordinates of the location of the circuit segments 301P1, 301P2 and 301P2 at their respective circuit levels M1, M2 and M3. And the layer parameters and 2D coordinates of the circuit segments 301P1, 301P2 and 301P3 can be combined to form a vector information.

Next, as described in sub-step S222, a plurality of cutting images of the failure path configuration diagrams (the collection of 2D circuit mask layout patterns corresponding to the circuit segments 301P1, 301P2 and 301P3) are extracted. For example, in some embodiments of the present disclosure, multiple (three) 2D circuit mask layout patterns of the circuit segments 301P1, 301P2 and 301P3 forming the failure circuit 301 in the circuit layers M1, M2 and M3 can be extracted by an image segmentation using a point of interest (POI) algorithm, so as to obtain hundreds of thousands of cutting images.

Subsequently, as described in sub-step S223, these cutting images are classified to obtain a plurality of image groups. In some embodiments of the present disclosure, the feature classification unit 103 including a machine learning module 103M is applied to classify these cutting images applies. The user can input a preset number of image groups (that is, a specific positive integer, such as 9), and use a cluster analysis algorithm or a classification algorithm of unsupervised learning to divide these (hundreds of thousands of) cutting images into the specific number of image groups, according to the characteristics of these cut images.

Figure 4:
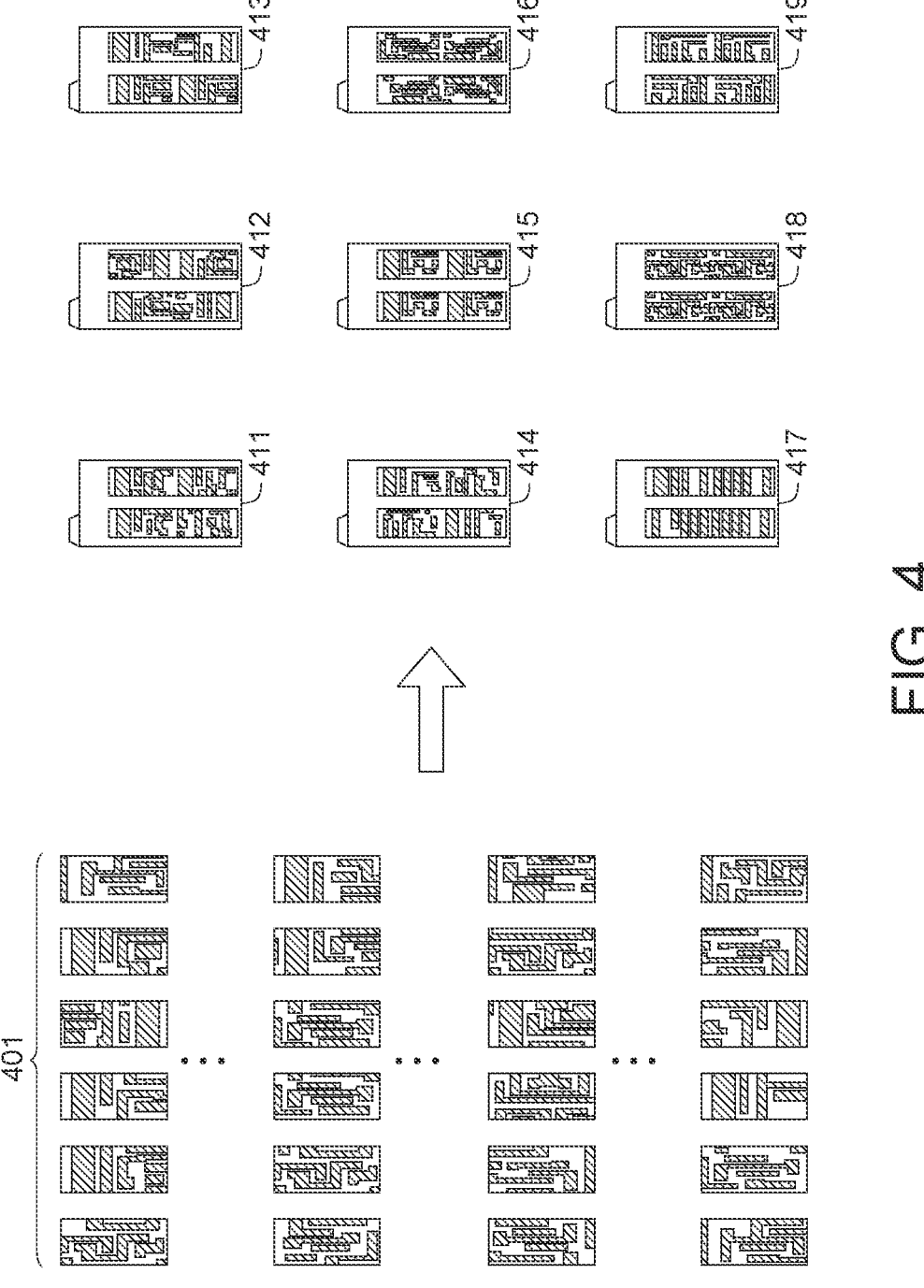
FIG. 4 is a diagram illustrating a step of using a feature classification unit to classify a plurality of cutting images extracted from of a failure path configuration diagrams, so as to distinguish them into a specific number of image groups, in accordance with one embodiment of the present disclosure.

FIG. 4 is a diagram illustrating a step of using the feature classification unit 103 to classify a plurality of cutting images extracted from of a failure path configuration diagrams (the collection of 2D circuit mask layout patterns corresponding to the circuit segments 301P1, 301P2 and 301P3), so as to distinguish them into a specific number (e.g., 9) of image groups (e.g., the image groups 411 to 419), in accordance with one embodiment of the present disclosure.

As described in step S23 of FIG. 2, a failure risk assessment is performed. In some embodiments of the present disclosure, the failure risk assessment includes sub-steps as follows: Firstly, described in step S231 of FIG. 2, a risk pre-assessment is performed on these image groups (e.g., the image groups 411 to 419) to select at least one high-risk group therefrom. For example, through the risk pre-assessment, the image groups 415, 416 and 418 are determined as high-risk groups (hereinafter referred to as high-risk groups 415, 416 and 418).

In some embodiments of the present disclosure, a morphological image processing method, such as dilation (or erosion) algorithm (opening and closing algorithm), in computer vision technology can be applied to perform the risk pre-assessment to select the high-risk groups. A plurality of successive dilation or erosion simulations under various conditions are performed on the characteristic patterns of each image group (e.g., image groups 411-419) to calculate the change of the total number of polygonal patterns in the simulation results. Such that, risk values of the short circuit or open circuit in the characteristic patterns can be estimated.

Figures 5A, 5B, 5C:
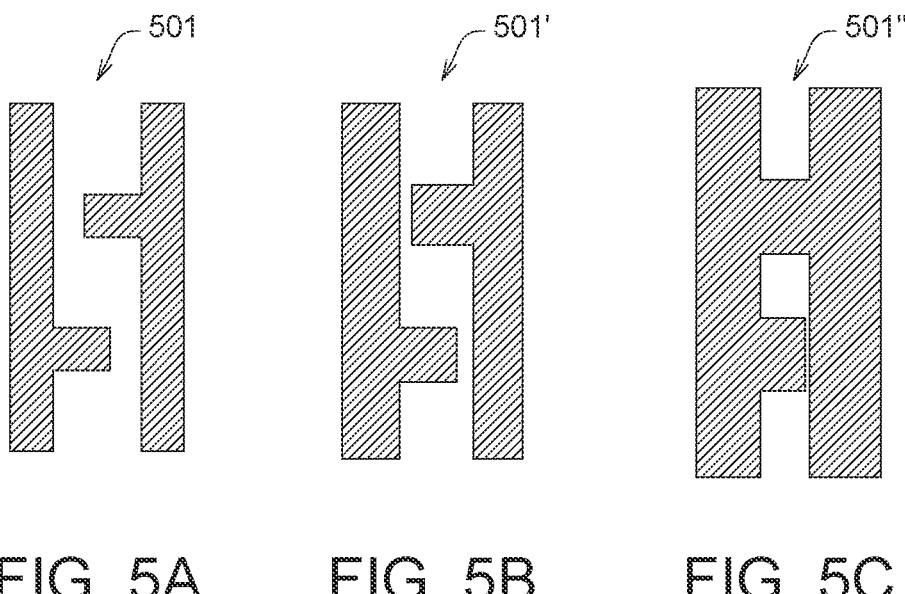
FIGS. 5A-5C are diagrams illustrating a method of using a dilation algorithm to perform a risk pre-assessment on a specific image group, in accordance with one embodiment of the present disclosure.

For example, FIGS. 5A-5C are diagrams illustrating a method of using a dilation algorithm to perform a risk pre-assessment on a specific image group (e.g., the image group 416), in accordance with one embodiment of the present disclosure. FIG. 5A shows the original characteristic pattern 501 of the image group 416. FIG. 5B and FIG. 5C show the simulated characteristic patterns 501' and 501" obtained by simulating the length and width dimensions of the original feature pattern 501 expanding by 10% and 20%, respectively, using the dilation algorithm. When the original characteristic pattern 501 is expanded to as shown in FIG. 5C, the simulated characteristic pattern 501" has been merged from the original two separate polygonal patterns (as depicted in FIG. 5A) into a single polygonal pattern. It can be seen that the original characteristic pattern 501 of the image group 415 may have the risk to form a short circuit under certain process conditions. Accordingly, it can be determined that the image group 416 is a high-risk group.

Figures 6A, 6B, 6C:
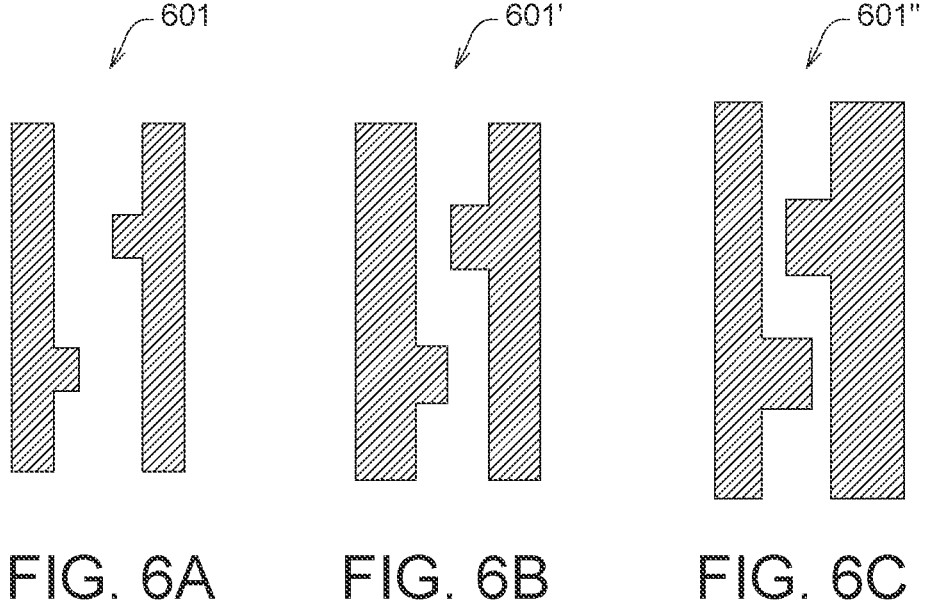
FIGS. 6A-6C are diagrams illustrating a method of using a dilation algorithm to perform a risk pre-assessment on a specific image group, in accordance with another embodiment of the present disclosure.

FIGS. 6A-6C are diagrams illustrating a method of using a dilation algorithm to perform a risk pre-assessment on a specific image group (e.g., the image group 413), in accordance with another embodiment of the present disclosure. FIG. 6A shows the original characteristic pattern 601 of the image group 413. FIG. 6B and FIG. 6C show the simulated characteristic patterns 601' and 601" obtained by simulating the length and width dimensions of the original characteristic pattern 601 expanding by 10% and 20%, respectively, using the dilation algorithm. When the original characteristic pattern 601 is expanded to as shown in FIG. 6C, the two independent polygonal patterns (originally shown as the original characteristic pattern 601 in FIG. 6A) of the simulated characteristic pattern 601" have not yet merged to form a single polygonal pattern. It can be seen that the risk to form a short circuit in the original characteristic pattern 401 of the image group 413 is not high during the manufacturing process. Accordingly, it can be determined that the image group 413 is not a high-risk group.

Figures 7A, 7B, 7C, 8A, 8B, 8C:
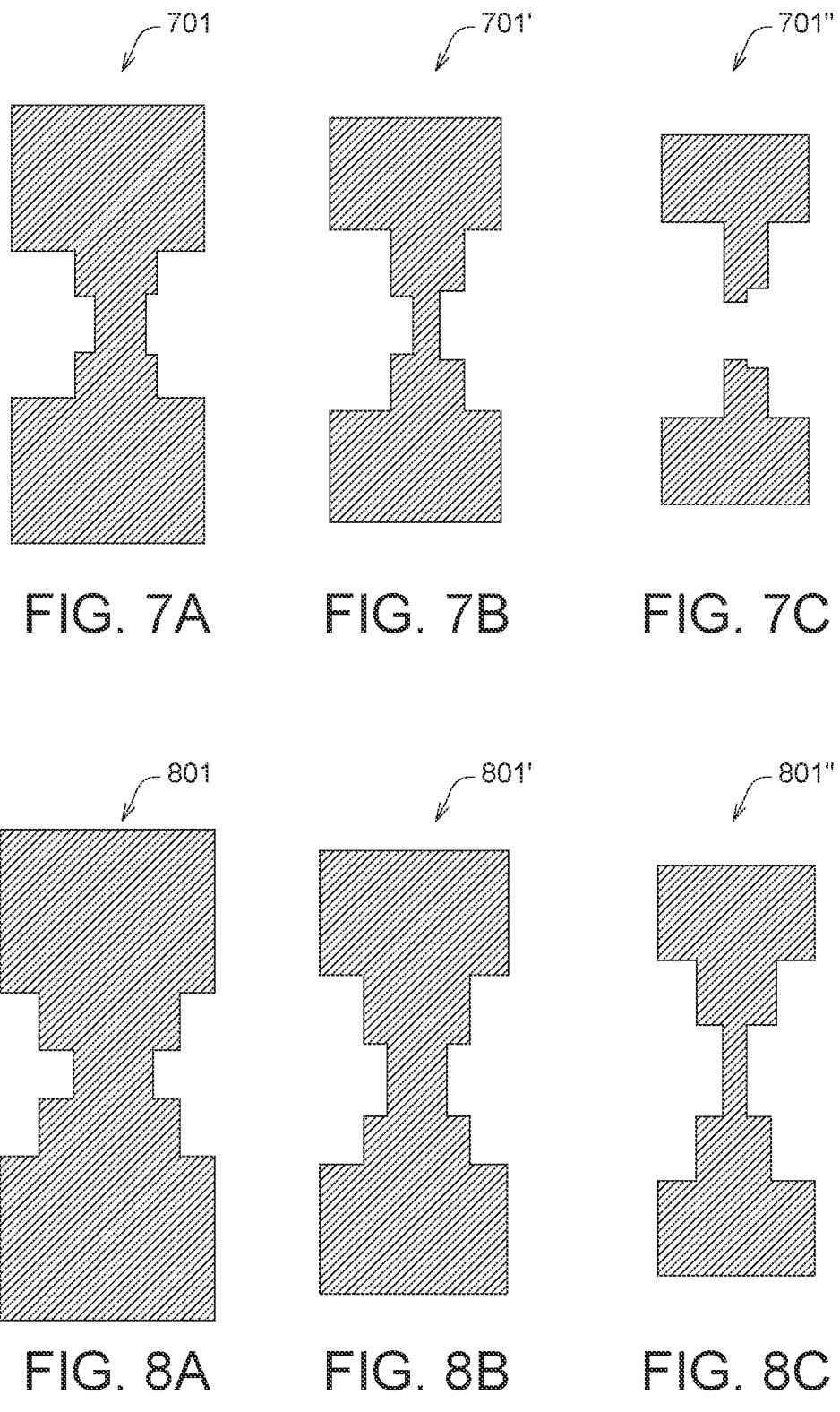
FIGS. 7A-7C are diagrams illustrating a method of using an erosion algorithm to perform a risk pre-assessment on a specific image group, in accordance with one embodiment of the present disclosure.
FIGS. 8A-8C are diagrams illustrating a method of using an erosion algorithm to perform a risk pre-assessment on a specific image group, in accordance with yet another embodiment of the present disclosure.

FIGS. 7A-7C are diagrams illustrating a method of using an erosion algorithm to perform a risk pre-assessment on a specific image group (e.g., the image group 418), in accordance with one embodiment of the present disclosure. FIG. 7A shows the original characteristic pattern 701 of the image group 418. FIG. 7B and FIG. 7C show the simulated characteristic patterns 701' and 701" obtained by simulating the length and width dimensions of the original characteristic pattern 701 corroded by 10% and 20%, respectively, using the erosion algorithm. When the original characteristic pattern 701 is corroded to FIG. 7C, the original single polygonal pattern (as depicted in FIG. 7A) has been broken into two independent polygonal patterns in the simulated characteristic pattern 701". It can be seen that the original characteristic pattern 701 of the image group 418 may have the risk to form an open circuit under certain process conditions. Accordingly, it can be determined that the image group 418 is a high-risk group.

FIGS. 8A-8C are diagrams illustrating a method of using an erosion algorithm to perform a risk pre-assessment on a specific image group (e.g., the image group 417), in accordance with another embodiment of the present disclosure. FIG. 8A shows the original characteristic pattern 801 of the image group 417. FIG. 8B and FIG. 8C show the simulated characteristic patterns 801' and 801" obtained by simulating the length and width dimensions of the original characteristic pattern 801 corroded by 10% and 20%, respectively, using the erosion algorithm. When the original characteristic pattern 801 is corroded to FIG. 8C, the original single polygonal pattern (as depicted in FIG. 8A) has not yet been broken into two independent polygonal patterns in the simulated characteristic pattern 801". It can be seen that the risk to form an open circuit in the original characteristic pattern 801 of the image group 417 under certain process condition is not high. Accordingly, it can be determined that the image group 418 is not a high-risk group.

As described in sub-step S232 of FIG. 2, a failure risk analysis using the failure risk assessment unit 104 is performed on each cutting image of the high-risk groups (e.g., high-risk groups 415, 416 and 418). For example, in some embodiments of the disclosure, the failure risk assessment unit 104 can include a deep learning module 104a (as shown in FIG. 1), which can provide a prediction image for each cutting image in each high-risk group (e.g., each cutting image in the high-risk groups 415, 416 and 418), and a risk score can be given according to the predicted image.

Figure 9:
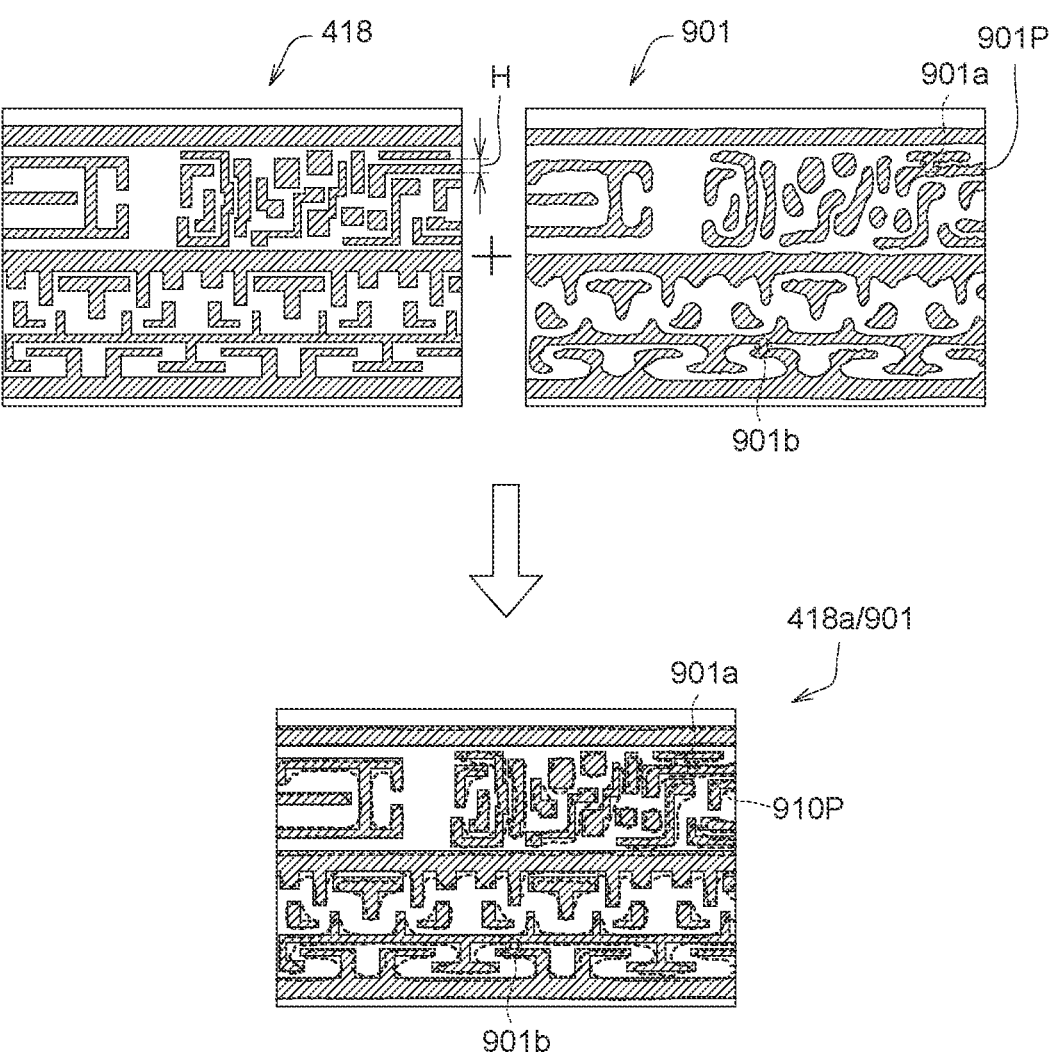
FIG. 9 is a predicted image output after inputting one cutting image of a high-risk group into a deep learning module, in accordance with one embodiment of the present disclosure.

In the present embodiment, the build of the deep learning module 104a includes steps of extracting a large amount of historical data stored in a database 111, and training them with an artificial intelligence algorithm, so that when an image data of a semiconductor mask layout is input into the deep learning module, a simulated circuit patterns (also referred as a predicted image) of a semiconductor circuit structure can be output therefrom correspondingly. Wherein, the historical data include several semiconductor mask layouts for forming different semiconductor circuit structures in the existing manufacturing process and image data of different circuit patterns actually formed according to these semiconductor mask layouts. For example, please refer to FIG. 9, FIG. 9 is a predicted image 901 obtained by inputting one cutting image 418a of a high-risk group 418 (a portion of the semiconductor mask layout) into a deep learning module 104a, in accordance with one embodiment of the present disclosure.

Subsequently, an image overlay module 104b is used to overlay the predicted image 901 and the original input cutting image 418a, and then compare the overlap ratio of the predicted image 901 and the cutting image 418a and/or the line width difference between the cutting image 418ap and the differential pattern (i.e., the remaining pattern except the overlapping portion), such that the risk score can be given by referencing the comparison results. For example, in the present embodiment, the differential patterns 901a and 901b resulted from comparing the predicted image 901 and the cutting image 418a with each other are larger than the preset line width H of the cutting image 418a, which may cause the risk to form a short circuit in the simulated semiconductor circuit structure. Accordingly, a high risk score is given to the cutting image 418a.

Thereafter, as described in step S24 of FIG. 2, at least one high failure risk position is predicted in the semiconductor mask layout according to the results of the failure risk analysis (e.g., the risk score) and the location information. For example, in some embodiments of the present disclosure, a further targeted PFA can be performed on the portion of the semiconductor circuit structure at which the cutting image 418a with a high risk score is located. Such that, at least one high failure risk position 105 can be predicted in the semiconductor mask layout for forming the semiconductor circuit structure 30, without investing too much detection resources, which can greatly save the time and cost of the process and detection.

In addition, the failure risk assessment unit 104 may optionally include a critical dimension (CD) simulation module 104c used to provide simulated impurity particle patterns of different sizes that may occur in different critical dimension processes, according to historical data, for performing a failure simulation on each cutting image in the high-risk groups (e.g., high risk groups 415, 416 and 418) to adjust or assign the aforementioned risk score.

Figures 10A, 10B:
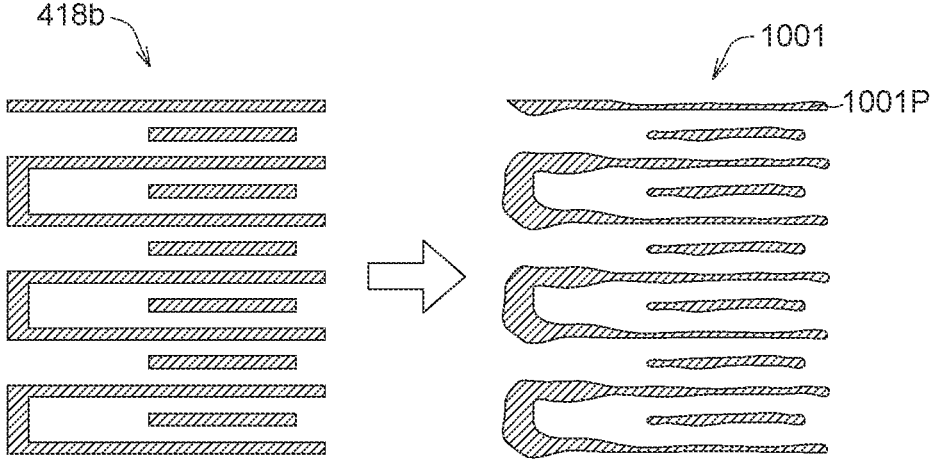
FIGS. 10A-10C are diagrams illustrating a method of using a critical dimension simulation module to perform a failure simulation on a cutting image in a high-risk group, in accordance with one embodiment of the present disclosure.
Figure 10C:
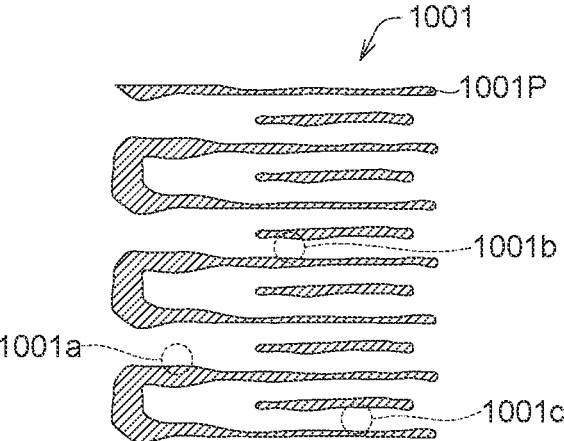

FIGS. 10A-10C are diagrams illustrating a method of using the CD simulation module 104c to perform a failure simulation on a cutting image in a high-risk group, in accordance with one embodiment of the present disclosure. FIG. 10A shows another cutting image 418b in the high-risk group 418. FIG. 10B shows the output prediction image 1001 obtained by inputting the cutting image 418b corresponding to the semiconductor mask layout into the deep learning module 104a. FIG. 10C shows impurity particle patterns (e.g., the impurity particle patterns 1001a, 1001b, and 1001c) of different sizes simulated by the CD simulation module 104c.

A specific number of impurity particle patterns 1001a, 1001b or 1001c with a specific size are inserted into the line gaps of the circuit pattern 1001P in the predicted image 1001, and the coverage rate of the impurity particle pattern 1001a, 1001b or 1001c and the circuit pattern 1001P in the predicted image 1001 can be calculated to evaluate the possibility of short circuit or open circuit formed in the circuit pattern 1001P during the manufacturing process with the specific CD, and/or to adjust the risk score of the cutting image 418*b* accordingly. While, during the simulation, the larger the CD of the impurity particle pattern used, the lower the given risk score.

In some embodiments, when the cutting image 418*b* has been determined to have a high risk score by the CD simulation module 104*c*, it can be directly determined that the position in the failure circuit 301 of the semiconductor circuit structure 30, corresponding to the positon in the cutting image 411*b* on which the certain impurity particle pattern 1001*a*, 1001*b* or 1001*c* located, as a high-risk position of physical defects.

It is worth noting that the image overlay module 104*b* and the CD simulation module 104*c* can be either used separately or in combination for performing the failure risk analysis on each cutting image of the high-risk group (e.g., each of the high-risk groups 415, 416 and 418) to predict the high failure risk position 105. In some embodiments, the image overlay module 104*b* and the CD simulation module 104*c* are used in combination for performing the failure risk analysis on each cutting image of the high-risk group (e.g., each of the high-risk groups 415, 416 and 418) to predict the high failure risk position 105 in the semiconductor mask layout for forming the semiconductor circuit structure 30.

For example, in the embodiment as shown in FIG. 9, when the image overlay module 104*b* has determined that the cutting image 418*a* has a high risk score, a failure simulation can be performed on the cutting image 418*a* using the CD simulation module 104*c* to provide a specific number of impurity particle patterns (not shown) with a single CD inserted between the line gaps of the circuit pattern 901P in the predicted image 901; and it can be directly determined that the positions in the failure circuit 301 of the semiconductor circuit structure 30, corresponding to the positions in the cutting image 418*b* on which the certain impurity particle patterns located, as high-risk positions of physical defects.

In accordance with the aforementioned embodiments of the present disclosure, a module for predicting semiconductor physical defects and method thereof are provided. Firstly, a defect diagnosis is performed on the chip probe test data collected during the fabrication of a semiconductor circuit structure based on a semiconductor mask layout, in which a ATPG system and a preset test pattern information corresponding to the semiconductor circuit structure are applied to detect at least one failure circuit from the semiconductor circuit structure. Next, a failure path configuration diagram corresponding to the at least one failure circuits and the location information (e.g. the vectors) corresponding to the failure path configuration diagram can be obtained from the semiconductor mask layout. A plurality of cutting images of the failure path configuration diagram are extracted, and a feature classification is performed on these cutting images to obtain a plurality of image groups. A risk pre-assessment is performed on these image groups to select at least one high-risk group therefrom, and a failure risk analysis is performed on each cutting image in the high risk group to predict at least one high failure risk position in the semiconductor mask layout according to the results of the risk assessment and the location information.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A module for predicting semiconductor physical defects, comprising:
   a defect diagnosis unit, used to detect at least one failure circuit in a semiconductor circuit structure;
   an information acquisition unit, used for obtaining a semiconductor mask layout for forming the semiconductor circuit structure, and obtaining at least one failure path configuration diagram corresponding to the at least one failure circuit and a location information corresponding to the at least one failure path configuration diagram from the semiconductor mask layout;
   a feature classification unit, used for extracting a plurality of cutting images of the at least one failure path configuration diagram, and performing a feature classification on the plurality of cutting images to obtain a plurality of image groups; and
   a failure risk assessment unit, used for:
      performing a risk pre-assessment on these image groups to select at least one high-risk group therefrom; and
      performing a failure risk analysis on each cutting image in the high risk group to predict at least one high failure risk position in the semiconductor mask layout according to results of the failure risk analysis and the location information.

2. The module for predicting semiconductor physical defects according to claim 1, wherein the failure risk assessment unit comprises a deep learning module used for providing a prediction image for the each cutting image and giving a risk score according to the predicted image.

3. The module for predicting semiconductor physical defects according to claim 2, further comprising a critical dimension (CD) simulation module used to perform a failure simulation on the each cutting image in the at least one high-risk group to adjust or assign the risk score.

4. The module for predicting semiconductor physical defects according to claim 1, wherein the defect diagnosis unit comprises a scan-chain diagnosis unit.

5. The module for predicting semiconductor physical defects according to claim 1, wherein the location information comprises a plurality of coordinates corresponding to the each cutting image of the at least one failure path configuration diagram.

6. The module for predicting semiconductor physical defects according to claim 1, wherein the feature classification unit comprises a machine learning module.

7. A method for predicting semiconductor physical defects, comprising:
   performing a defect diagnosis on to detect a failure circuit in a semiconductor circuit structure;
   performing a feature classification, comprising:
      obtaining a semiconductor mask layout for forming the semiconductor circuit structure; and obtaining a failure path configuration diagram corresponding to the failure circuit and a location information corresponding to the failure path configuration diagram from the semiconductor mask layout; and
      extracting a plurality of cutting images from the failure path configuration diagrams of the failure circuit, and classifying the plurality of cutting images to obtain a plurality of image groups; and
   performing a failure risk assessment, comprising:
      performing a risk pre-assessment on the plurality of image groups to select at least one high-risk group therefrom; and performing a failure risk analysis on each cutting image in the at least one high risk group to predict at least one high failure risk position in the semiconductor mask layout according to results of the failure risk analysis and the location information.

8. The method for predicting semiconductor physical defects according to claim 7, wherein the step of performing the failure risk analysis comprises using a deep learning module to provide a prediction image for the each cutting image in the at least one high-risk group and giving a risk score according to the predicted image.

\*    \*    \*    \*    \*